(12) United States Patent
Leier et al.

(10) Patent No.: US 11,299,210 B2
(45) Date of Patent: Apr. 12, 2022

(54) STRUCTURAL INTEGRATION BRACE FOR FRONT VEHICLE COMPARTMENT

(71) Applicant: GM GLOBAL TECHNOLOGY OPERATIONS LLC, Detroit, MI (US)

(72) Inventors: Bradley Leier, Troy, MI (US); Mark A. Stebbins, Bloomfield Hills, MI (US); Joung Min Choi, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 109 days.

(21) Appl. No.: 16/888,032

(22) Filed: May 29, 2020

(65) Prior Publication Data
US 2021/0371014 A1    Dec. 2, 2021

(51) Int. Cl.
*B62D 25/08* (2006.01)
*B60K 1/04* (2019.01)
*B62D 25/04* (2006.01)

(52) U.S. Cl.
CPC .............. *B62D 25/085* (2013.01); *B60K 1/04* (2013.01); *B62D 25/04* (2013.01); *B62D 25/088* (2013.01)

(58) Field of Classification Search
CPC ...... B62D 25/08; B62D 25/085; B62D 25/04; B62D 25/088; B60K 1/04
See application file for complete search history.

(56) References Cited

U.S. PATENT DOCUMENTS

| | | | |
|---|---|---|---|
| 11,161,549 B2 | 11/2021 | Sakai et al. | |
| 2011/0139526 A1* | 6/2011 | Lucas | B60K 1/04 180/68.1 |
| 2012/0169023 A1* | 7/2012 | Rawlinson | B62D 25/088 280/124.155 |
| 2014/0117718 A1* | 5/2014 | Van Kaam | B62D 25/082 296/193.01 |
| 2016/0375855 A1* | 12/2016 | Hausler | B60J 1/005 296/187.04 |
| 2021/0016833 A1* | 1/2021 | Moss | B62D 21/09 |

FOREIGN PATENT DOCUMENTS

| | | |
|---|---|---|
| DE | 102005036254 A1 | 5/2006 |
| DE | 112017000108 T5 | 5/2018 |
| DE | 202018104149 U1 | 9/2018 |
| DE | 102017003392 A1 | 10/2018 |
| DE | 102019214369 A1 | 4/2020 |
| JP | 2020142627 A | 10/2020 |
| WO | WO-2020109544 A1 * | 6/2020 ............. B62D 27/06 |

* cited by examiner

*Primary Examiner* — Lori L Lyjak
(74) *Attorney, Agent, or Firm* — Lorenz & Kopf LLP

(57) ABSTRACT

In accordance with an exemplary embodiment, a vehicle is provided that includes: a body; a drive system configured to propel the body; and a front motor compartment formed within the body, the front motor compartment including: a first shock tower; a second shock tower; and a structural integration brace for a vehicle, including: a first end attached to a first shock tower of the vehicle; and a second end attached to a second shock tower of the vehicle; wherein the structural integration brace extends between the first end and the second end, generating a load path therebetween within the front motor compartment of the vehicle.

17 Claims, 5 Drawing Sheets

STRUCTURAL INTEGRATION BRACE FOR FRONT VEHICLE COMPARTMENT

INTRODUCTION

The technical field generally relates to the field of vehicles and, more specifically, to structural support apparatus for vehicles.

Vehicles today include structural support apparatus for the vehicle, including in a front vehicle compartment. However, it may be desirable to provide structural support apparatus with a different load path for certain types of vehicles.

Accordingly, it is desirable to provide structural support apparatus and systems for vehicles with a different load path. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a structural integration brace for a vehicle is provided, that includes: a first end configured to be attached to a first shock tower of the vehicle; and a second end configured to be attached to a second shock tower of the vehicle; wherein the structural integration brace extends between the first end and the second end, generating a load path therebetween within a front motor compartment of the vehicle.

Also in an exemplary embodiment, the load path has an intersection point that is disposed within the structural integration brace itself.

Also in an exemplary embodiment, the structural integration brace is further configured to extend through a front of dash of the vehicle to a front body hinge pillar of the vehicle.

Also in an exemplary embodiment, the load path generated by the structural integration brace is further configured to extend through a front-of-dash toe pan brace, the front body hinge pillar, and a toe pan brace bulkhead of the vehicle.

In another exemplary embodiment, a front motor compartment for a vehicle is provided, that includes: a first shock tower; a second shock tower; and a structural brace for a vehicle, that includes: a first end attached to a first shock tower of the vehicle; and a second end attached to a second shock tower of the vehicle; wherein the structural integration brace extends between the first end and the second end, generating a load path therebetween within the front motor compartment of the vehicle.

Also in an exemplary embodiment, the load path has an intersection point that is disposed within the structural integration brace itself.

Also in an exemplary embodiment, the structural integration brace extends through a front of dash of the vehicle to a front body hinge pillar of the vehicle.

Also in an exemplary embodiment, the load path generated by the structural integration brace is further configured to extend through a front-of-dash toe pan brace and also through a toe pan brace bulkhead of the vehicle.

Also in an exemplary embodiment, the front motor compartment further includes a storage compartment defined by a body of the front motor compartment and disposed above the structural integration brace; wherein the structural integration brace is configured to provide structural support for the storage compartment.

Also in an exemplary embodiment, the structural integration brace is bolted to the first and second shock towers with four front attachment bolts for each shock tower, In another exemplary embodiment, a vehicle is provided that includes: a body; a drive system configured to propel the body; and a front motor compartment formed within the body, the front motor compartment including: a first shock tower; a second shock tower; and a structural integration brace for a vehicle, including: a first end attached to a first shock tower of the vehicle; and a second end attached to a second shock tower of the vehicle; wherein the structural integration brace extends between the first end and the second end, generating a load path therebetween within the front motor compartment of the vehicle.

Also in an exemplary embodiment, the load path has an intersection point that is disposed within the structural integration brace itself.

Also in an exemplary embodiment, the structural integration brace extends through a front of dash of the vehicle to a front body hinge pillar of the vehicle.

Also in an exemplary embodiment, the load path generated by the structural integration brace is further configured to extend through a front-of-dash brace, a toe pan brace, a front body hinge pillar, a toe pan brace bulkhead, a floor panel, and a rocker.

Also in an exemplary embodiment, the vehicle further includes a storage compartment defined by a body of the front motor compartment and disposed above the structural integration brace; wherein the structural integration brace is configured to provide structural support for the storage compartment.

Also in an exemplary embodiment, the structural integration brace is bolted to the first and second shock towers with four front attachment bolts for each shock tower.

Also in an exemplary embodiment, the load path generated by the structural integration brace extends from the shock towers and front of dash through to rocker panels for vertical and fore/aft support and to a floor panel for fore/aft and lateral support.

Also in an exemplary embodiment, the structural integration brace includes a portion of the structural integration brace that connects the lateral portion to the diagonal portions of the structural integration brace.

Also in an exemplary embodiment, the vehicle includes an electric vehicle.

Also in an exemplary embodiment, the vehicle includes a convertible automobile having an A-pillar, and the structural integration brace is configured to provide structural support for the A-pillar by stabilizing a base of the front body hinge pillar.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
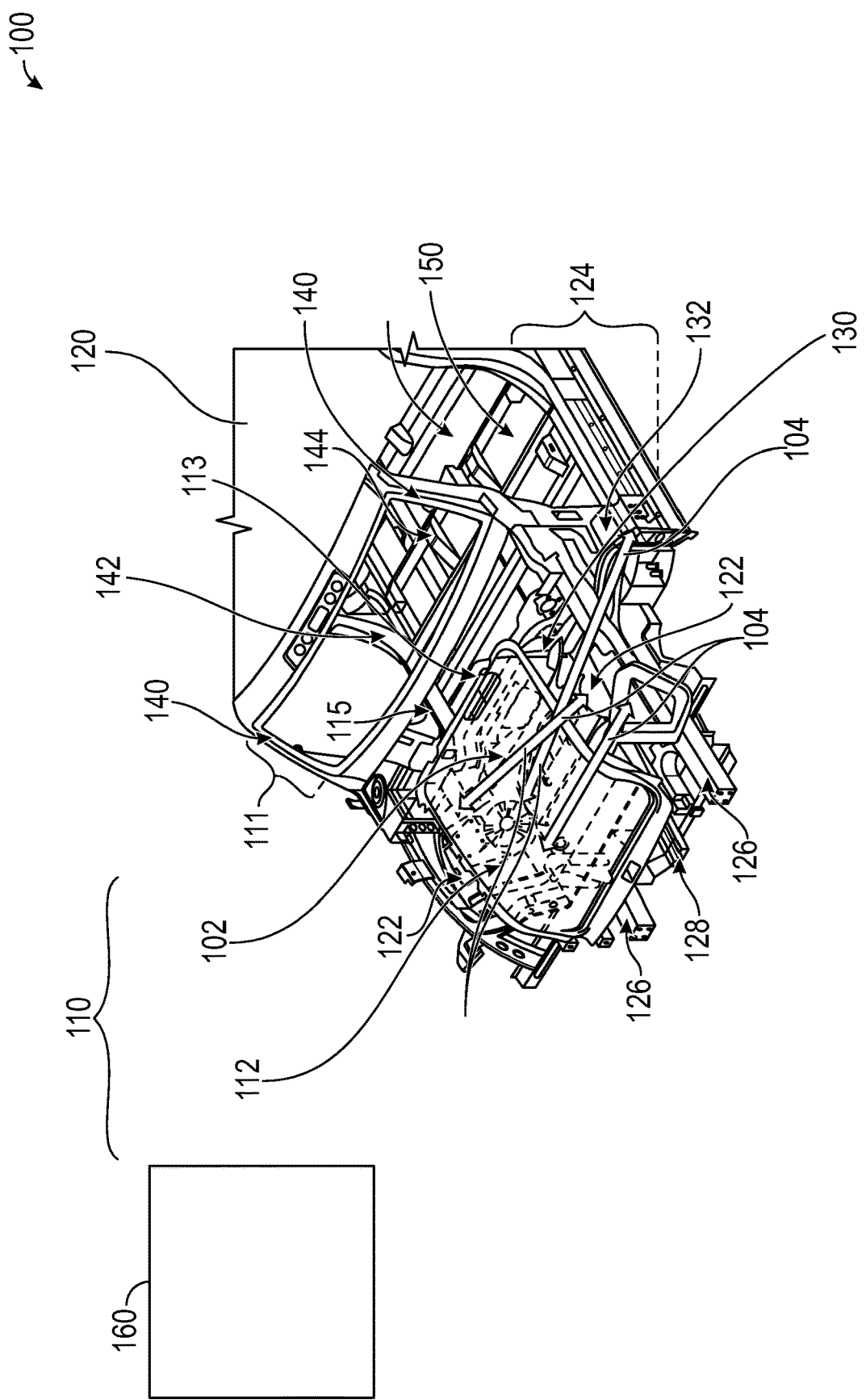
FIG. 1 is an isometric view of a vehicle having a structural integration brace in a front motor compartment, in accordance with an exemplary embodiment.
Figure 2:
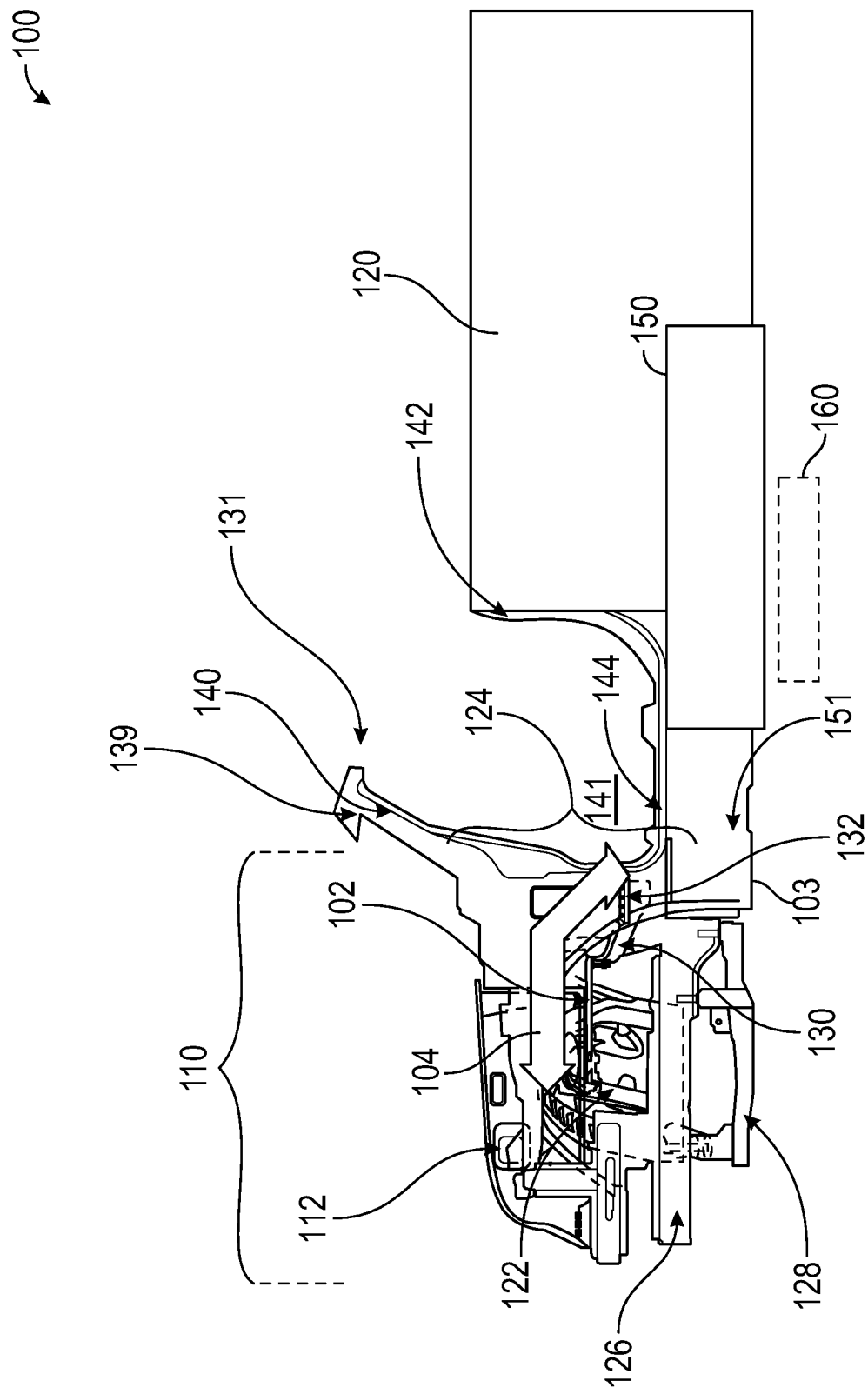
FIG. 2 is a side view of the vehicle of FIG. 1, in accordance with an exemplary embodiment.

FIGS. 1 and 2 illustrate a vehicle 100, according to an exemplary embodiment. Specifically, FIG. 1 provides an isometric view, and FIG. 2 provides a side view, of the vehicle 100.

As described in greater detail further below, the vehicle 100 includes a structural integration brace 102 that provides stiffness for the vehicle 100 along a critical load path 104 for the vehicle 100. In various embodiments, the critical load path 104 extends from the shock towers 122 and the front of dash to the front body hinge pillar 124, and with an intersection point within the structural integration brace 102 itself (as described further below in connection with FIG. 5).

As depicted in FIGS. 1 and 2, in various embodiments, the structural integration brace 102 is disposed within a front motor compartment 110 of the vehicle 100. As depicted in FIGS. 1 and 2, the structural integration brace 102 is installed within a body 103 of the vehicle 100, and, specifically, within the body 103 of the front motor compartment 110. In various embodiments, the structural integration brace 102 may be made of any of number of different materials such as, by way of example, magnesium, aluminum, steel, carbon fiber, and/or one or more other different types of materials.

As depicted in FIGS. 1 and 2, the structural integration brace 102 extends from the shock towers 122 and front of dash 113 (including the front-of-dash and toe pan braces 130 and the toe pan brace bulkheads 132 of FIGS. 1 and 2) to the floor panel 144, and to the front body hinge pillar (FBHP) 124 depicted in FIGS. 1 and 2. In various embodiments, and as described in greater detail below, the structural integration brace 102 provides cross-vehicle structural support, and provides efficient structural load paths through the critical load path 104 depicted in FIGS. 1 and 2, for the front motor compartment 110, and for the vehicle 100 as a whole.

Also as depicted in FIGS. 1 and 2, a front compartment storage region 112 is disposed above the shock towers 122 and the structural integration brace 102. In various embodiments, the front compartment storage region 112 comprises a storage compartment and/or bin that is supported by the structural integration brace 102. In various embodiments, the front compartment storage region 112 is defined by a body 103 of the front motor compartment 110, and is disposed directly above the structural integration brace 102. In various embodiments, the structural integration brace 102 provides structural support for the storage compartment for the front compartment storage region 112.

In addition, as depicted in FIGS. 1 and 2, longitudinal motor rails 126 and a front chassis cradle 128 are disposed beneath the structural integration brace 102 and the shock towers 122. A windshield 111 and plenum 115 are also depicted in FIG. 1 in proximity to the front of dash 113.

In addition, as depicted in FIGS. 1 and 2, an A-pillar 140 is connected to the front body hinge pillar 124, and provides additional stiffness and support. Additionally, as depicted in FIGS. 1 and 2, a rechargeable energy storage system 150 is disposed beneath the floor panel 144 and between rocker panels 151 thereof. A header 139 is also depicted alongside the A-pillar 140.

Also in the depicted embodiment, occupants for the vehicle 100 would sit in a center and/or rear compartment(s) (or seating region) 141 above the floor panel 144. In addition, also as depicted in FIGS. 1 and 2, a B-pillar 142 is disposed behind the cabin region 141 (providing additional support), and center and rear compartments 120 are disposed between the B-pillar 142.

Also in certain embodiments, the vehicle 100 comprises a convertible automobile. In such embodiments of a convertible automobile, there would typically no direct upper load-path (e.g., as illustrated by region 131 of FIG. 2). Accordingly, in such embodiments, the structural integration brace 102 helps to support the A-Pillar (which would not otherwise have direct support, for example for lack of a roof rail) by stabilizing the base of the front body hinge pillar 124. In various embodiments, such as for a convertible automobile, the structural integration brace 102 helps to effectively lower the load path into structure of the body of the vehicle 100.

In certain embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle and/or one or more other types of vehicles. In addition, in various embodiments, it will also be appreciated that the vehicle 100 may comprise any number of other types of mobile platforms.

In various embodiments, the body 103 substantially encloses other components of the vehicle 100. Also in the depicted embodiment, the vehicle 100 includes or more axles and wheels (not depicted) that are powered by a drive system 160 to facilitate movement of the vehicle 100. In various embodiments, the drive system 160 is mounted on the front chassis cradle 128 under the front compartment storage 112 and the structure In various embodiments, the vehicle 100 is a battery electric vehicle, and the rechargeable energy storage system 150 is part of and/or coupled to the drive system 160.

Figure 3:
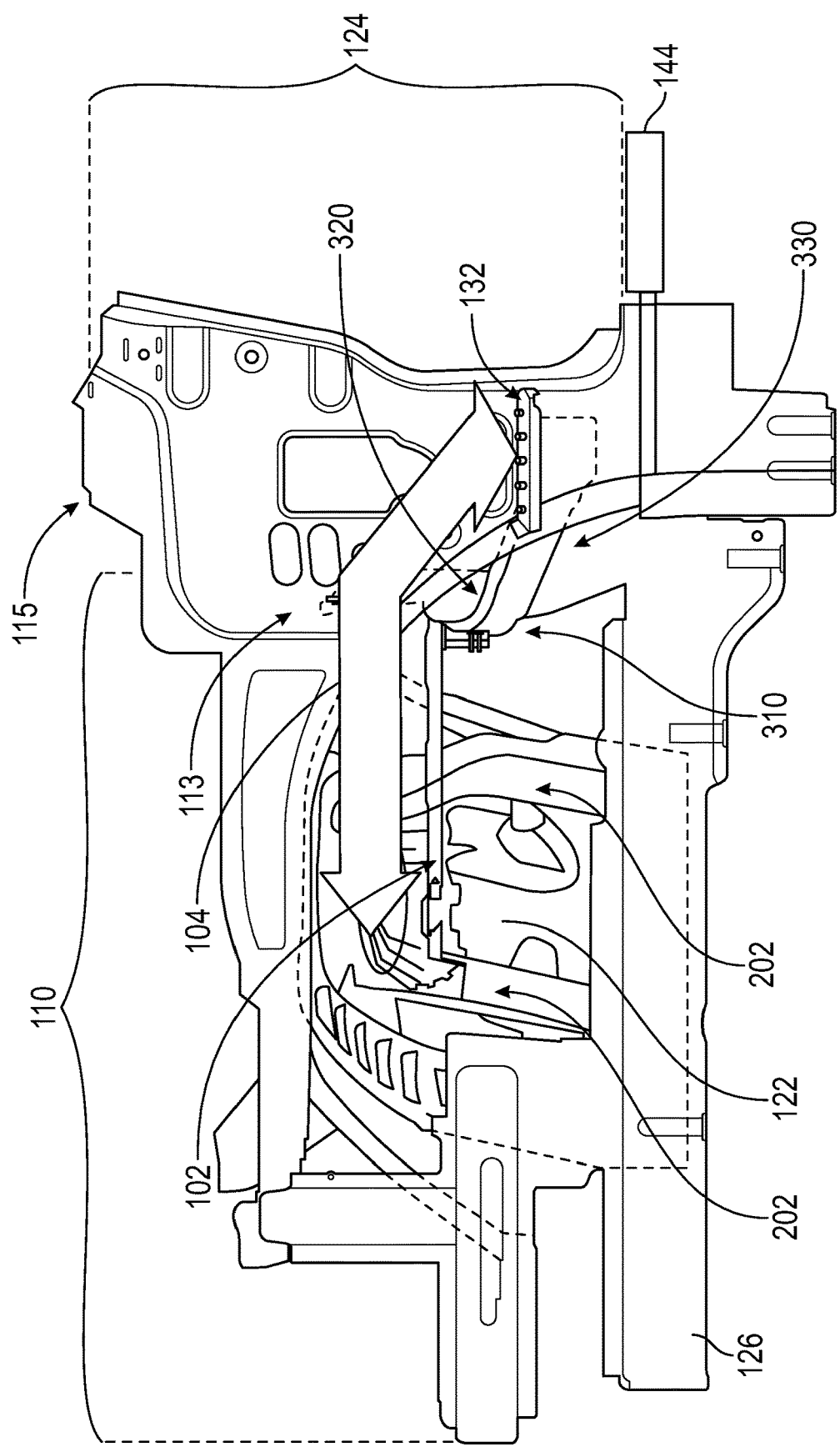
FIG. 3 is a side view of the front motor compartment of the vehicle of FIGS. 1 and 2, in accordance with an exemplary embodiment.
Figure 4:
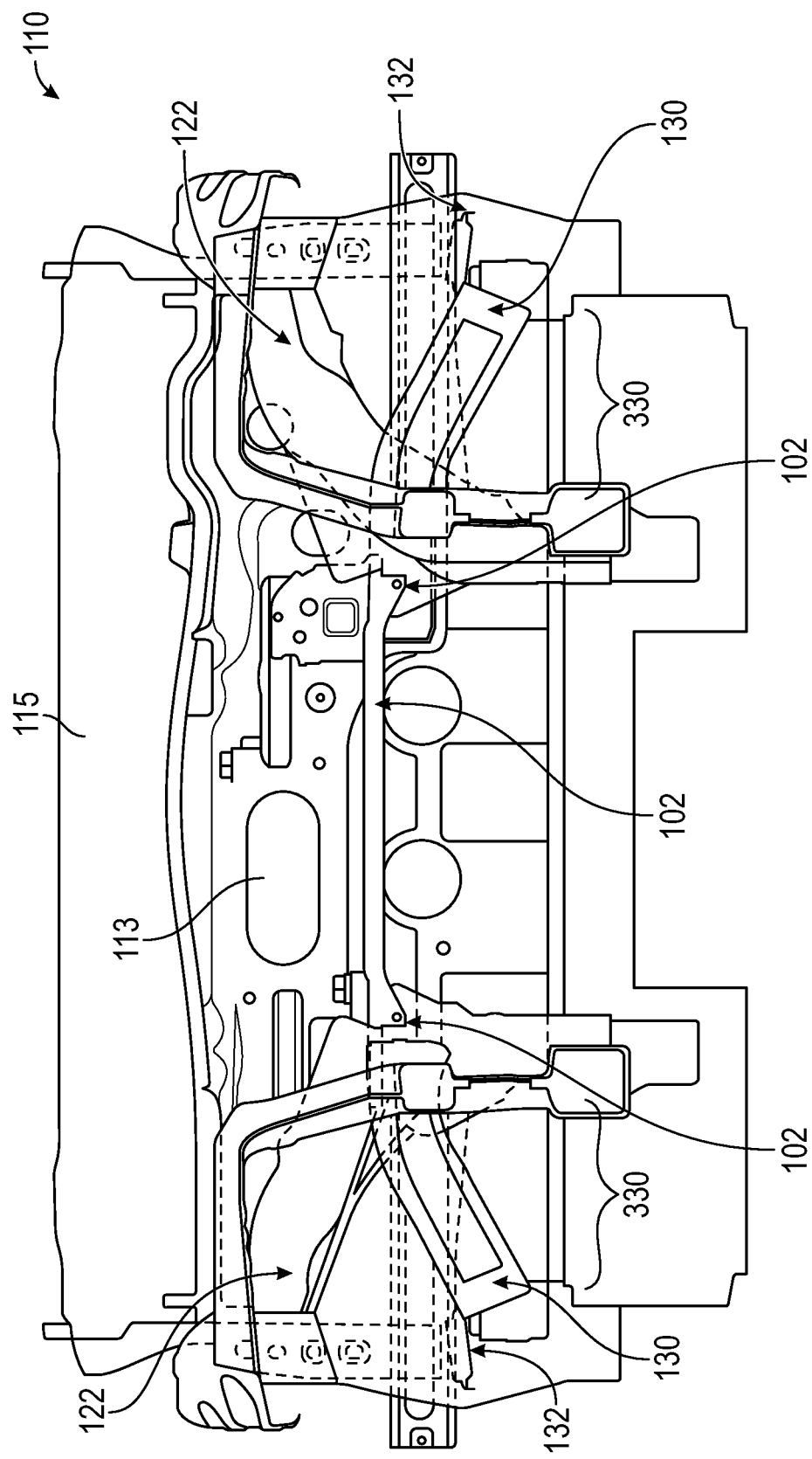
FIG. 4 is a front view of the front motor compartment of the vehicle of FIGS. 1 and 2, in accordance with an exemplary embodiment.
Figure 5:
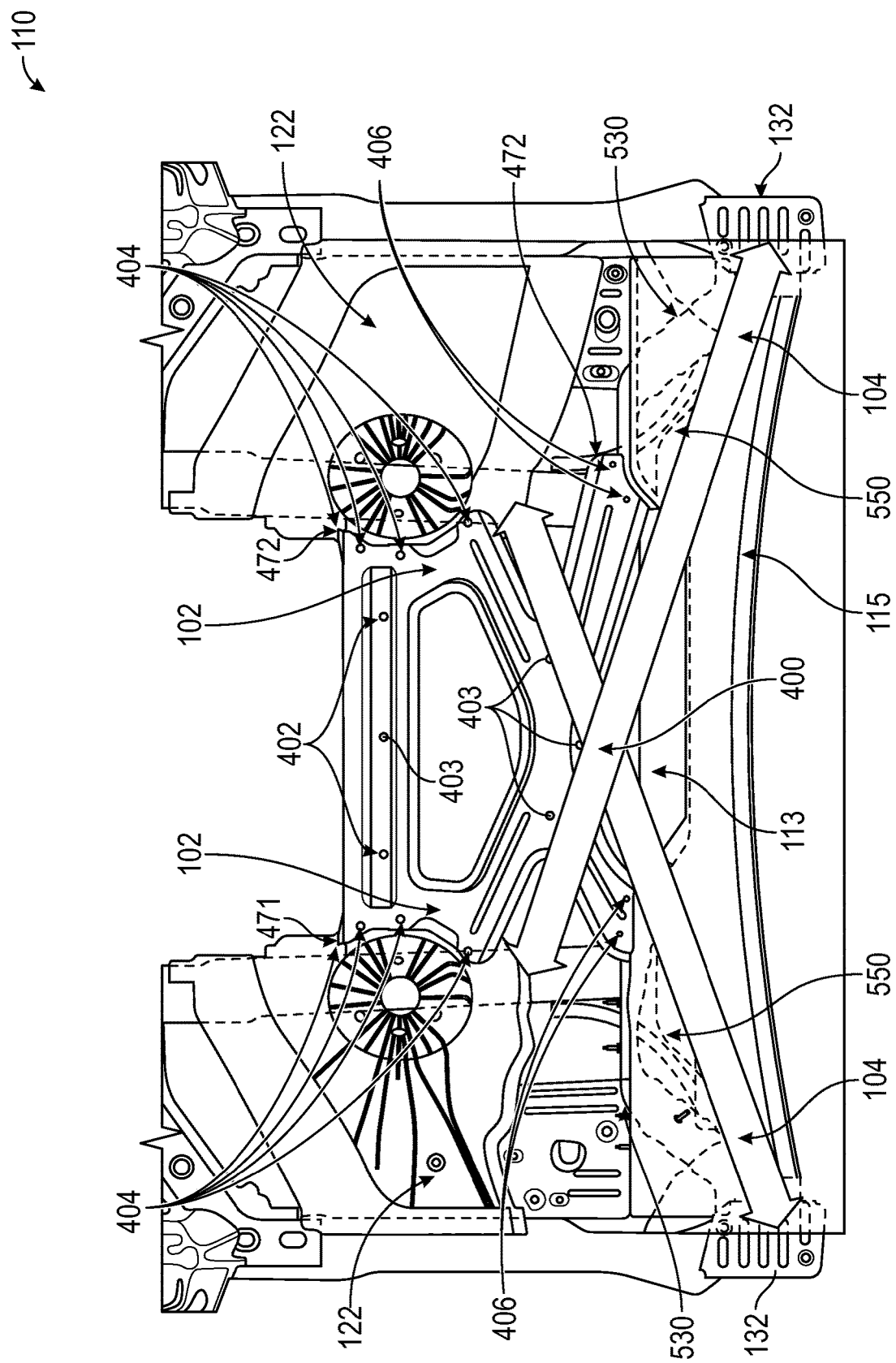
FIG. 5 is a top view of the front motor compartment of the vehicle of FIGS. 1 and 2, in accordance with an exemplary embodiment.

FIGS. 3-5 provide additional, close-up views of the front motor compartment 110 of the vehicle 100 of FIGS. 1 and 2, including the structural integration brace 102 thereof, in accordance with an exemplary embodiment. Specifically, (i) FIG. 3 is a side view; and (ii) FIG. 4 is a front view, and FIG. 5 is a top view, of the front motor compartment 110, including the structural integration brace 102 thereof, in accordance with an exemplary embodiment.

As depicted in FIG. 3, the structural integration brace 102 provides for structural support along the critical load path 104 extending through the front motor compartment 110 between the shock towers 122 (including upper control arms joint locations 202 thereof) along to the front-of-dash, toe pan brace 130 and the toe pan brace bulkhead 132 (and the front body hinge pillar 132 sandwiched therebetween), and above the longitudinal motor rails 126 and the floor panel 144.

Also as shown in FIG. 3, in various embodiments, the front of dash brace 310 is disposed in front of the front of dash 113, and the toe pan brace 320 is disposed behind the front of dash 113. In addition, also in an exemplary embodiment, as depicted in FIG. 3, the toe pan panels 330 continue the load path 104 into the front body hinge pillar 124, the rocker panels 151 (from FIG. 2), and the floor panel 144.

Further, as depicted in FIG. 4, the structural integration brace 102 extends through the front of dash 113, beneath a plenum 115 for the front motor compartment 110. In addition, also as depicted in FIG. 4, the structural integration brace 102 is mounted below the top on the inboard sides of the shock tower 122. Also as referenced in FIG. 4, the toe pan brace bulkheads 132 provide continuation of the structural support provided by the structural integration brace 102 and the front of dash 113 into a middle section of the front body hinge pillar 124. In addition, as depicted in FIG. 4, the front-of-dash braces 530 and toe pan braces 550 provide continuation of the structural support provided by the structural integration brace 102 at the front of dash 113 and angled to the lower portion of the front body hinge pillar 124 to be close to the floor panel 144 for additional support. As shown in FIG. 4, in various embodiments, the toe pan brace 550 and the front of dash brace 530 are two separate parts that surround (e.g., that sandwich) the toe panel panels 330 and the front of dash 113. In addition, as shown in FIG. 4, in an exemplary embodiment, the structural integration brace 102 includes fore and aft bolts 340 that are perpendicular in orientation to the other three bolts on each shock tower 122 (e.g., to bolts 404 depicted in FIG. 5 and described further below in connection therewith). It will be appreciated that the number of various types of bolts may vary in different embodiments.

With reference to FIG. 5, in an exemplary embodiment the structural integration brace 102 provides the critical load path 104 with an intersection point 400 that is disposed within the structural integration brace 102 (as depicted in FIG. 5), rather than at the front of dash (as is the case with certain other vehicles).

Also as depicted in FIG. 5, the structural integration brace 102 portion between the shock towers 122 connects to an X-section of the vehicle 100 at the flanks with four bolts 403 to the side to transfer load, in one embodiment. It will be appreciated that the number of bolts may vary in different embodiments.

Further, as also depicted in FIG. 5, the structural integration brace 102 also includes two storage attachment bolts 402 for connecting to the front motor compartment 110 (e.g., for supporting the front compartment storage 112 of FIGS. 1 and 2). It will be appreciated that the number of bolts may vary in different embodiments.

In addition, as depicted in FIG. 5, the structural integration brace 102 is bolted to each shock tower 122 with four front attachment bolts 404 apiece. Specifically, as depicted in FIG. 5, opposing ends 471, 472 of the structural integration brace 102 are both bolted to a respective shock tower 122 with four front attachment bolts, including three vertically oriented bolts 404 on each side (depicted in FIG. 5) and one horizontally oriented bolt 340 on each side (depicted in FIG. 4 and described above). It will be appreciated that the number of bolts may vary in different embodiments.

Also as depicted in FIG. 5, opposing ends 471, 472 of the structural integration brace 102 are also both bolted to the front of dash and toe pan braces 130 with two rear attachment bolts 406 apiece. It will be appreciated that the number of bolt may vary in different embodiments. In addition, as shown in FIG. 5, the structural integration brace 102 extends between the opposing ends 471, 472, generating the load path 104 therebetween, and with the load path 104 extending from the shock towers 122 through the front of dash 113 and front of dash braces 530 and toe pan braces 130 and the toe pan brace bulkheads 132, and inside the front body hinge pillar 124 (that is sandwiched between the toe pan braces 130 and the tow pan brace bulkheads 132), and into the rocker (e.g., the rocker panels 151) and the floor panel (e.g., the floor panel 144 depicted in FIGS. 1 and 2) within the front motor compartment 110 of the vehicle. For example, in one embodiment, the structural integration brace 102 configuration results in the load path 104 extending from the shock towers 122 and the front of dash 113 through to the rocker panels 151 for vertical and fore/aft support and to the floor panel 144 for fore/aft and lateral support.

Also as depicted in FIG. 5, the structural integration brace 102 provides a load path that ends through a front-of-dash brace 530, a front of dash panel (e.g., front of dash 113), a toe pan brace 550, a front body hinge pillar 124, and a floor panel 144 and rocker 151 (and also with further references to FIGS. 1 and 2).

In addition, as depicted in FIG. 5, the structural integration brace 102 includes a portion of the structural integration brace 102 that connects the lateral portion to the diagonal portions of the structural integration brace.

Accordingly, a structural integration brace is provided for a front motor compartment of a vehicle, such as a battery electric vehicle. In various embodiments, the structural integration brace extends from the shock towers through the front of dash and to the front body hinge pillar. In various embodiments, the structural integration brace provides for cross-vehicle structural support via the structural integration brace itself. In addition, in various embodiments, the structural integration brace provides structural support for a critical load path that extends from the shock tower and the front of dash to the front body hinge pillar, and with an intersection point within the structural integration brace itself (rather than in the front of dash). The structural integration brace, and the related configuration of the front motor compartment as depicted in the Figures and described herein, provide for an efficient support structure for the front motor compartment and the vehicle as a whole, as well as structural support for a storage compartment in the front motor compartment, potential improvements in free-free stiffness of the shock tower and the suspension attachment points, as well as potential mass reduction, potentially reduced strain concentration, potentially improved durability robustness, and potential improvements for the global static torsion of the vehicle, potentially improved global bending and torsion structural performances, and for the modal stiffness of the vehicle.

It will be appreciated that the vehicle, systems, apparatus, and components may vary from those depicted in the Figures and described herein. For example, in various embodiments, the structural integration brace 102, the front motor compartment 110, the vehicle 100, and/or components thereof may differ from those depicted in FIGS. 1-5 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A structural integration brace for a vehicle, comprising:
   a first end configured to be attached to a first shock tower of the vehicle; and
   a second end configured to be attached to a second shock tower of the vehicle;
   wherein the structural integration brace extends between the first end and the second end, generating a load path therebetween within a front motor compartment of the vehicle; and
   wherein the load path has an intersection point that is disposed within the structural integration brace itself.

2. The structural integration brace of claim 1, wherein the structural integration brace is further configured to extend through a front of dash of the vehicle to a front body hinge pillar of the vehicle.

3. The structural integration brace of claim 2, wherein the load path generated by the structural integration brace is further configured to extend through a front-of-dash toe pan brace, the front body hinge pillar, and a toe pan brace bulkhead of the vehicle.

4. A front motor compartment for a vehicle, comprising:
   a first shock tower;
   a second shock tower; and
   a structural integration brace for a vehicle, comprising:
      a first end attached to a first shock tower of the vehicle; and
      a second end attached to a second shock tower of the vehicle;
      wherein the structural integration brace extends between the first end and the second end, generating a load path therebetween within the front motor compartment of the vehicle; and
      wherein the load path has an intersection point that is disposed within the structural integration brace itself.

5. The front motor compartment of claim 4, wherein the structural integration brace extends through a front of dash of the vehicle to a front body hinge pillar of the vehicle.

6. The front motor compartment of claim 5, wherein the load path generated by the structural integration brace is further configured to extend through a front-of-dash brace a toe pan brace, a floor panel, and a rocker.

7. The front motor compartment of claim 4, further comprising:
   a storage compartment defined by a body of the front motor compartment and disposed above the structural integration brace;
   wherein the structural integration brace is configured to provide structural support for the storage compartment.

8. The front motor compartment of claim 4, wherein the structural integration brace is bolted to the first and second shock towers with four front attachment bolts for each shock tower.

9. A vehicle comprising:
   a body;
   a drive system configured to propel the body; and
   a front motor compartment formed within the body, the front motor compartment comprising:
      a first shock tower;
      a second shock tower; and
      a structural integration brace for a vehicle, comprising:
         a first end attached to a first shock tower of the vehicle; and
         a second end attached to a second shock tower of the vehicle;
         wherein the structural integration brace extends between the first end and the second end, generating a load path therebetween within the front motor compartment of the vehicle; and
         wherein the load path has an intersection point that is disposed within the structural integration brace itself.

10. The vehicle of claim 9, wherein the structural integration brace extends through a front of dash of the vehicle to a front body hinge pillar of the vehicle.

11. The vehicle of claim 10, wherein the load path generated by the structural integration brace is further configured to extend through a front-of-dash brace, a toe pan brace, a front body hinge pillar, a toe pan brace bulkhead, a floor panel, and a rocker.

12. The vehicle of claim 9, further comprising:
    a storage compartment defined by a body of the front motor compartment and disposed above the structural integration brace;
    wherein the structural integration brace is configured to provide structural support for the storage compartment.

13. The vehicle of claim 9, wherein the structural integration brace is bolted to the first and second shock towers with four front attachment bolts for each shock tower.

14. The vehicle of claim 9, wherein the load path generated by the structural integration brace extends from the shock towers and front of dash through to rocker panels for vertical and fore/aft support and to a floor panel for fore/aft and lateral support.

15. The vehicle of claim 9, wherein the structural integration brace includes a portion of the structural integration brace that connects the lateral portion to the diagonal portions of the structural integration brace.

16. The vehicle of claim 9, wherein the vehicle comprises a battery electric vehicle.

17. The vehicle of claim 10, wherein the vehicle comprises a convertible automobile having an A-pillar, and the structural integration brace is configured to provide structural support for the A-pillar by stabilizing a base of the front body hinge pillar.

* * * * *